(12) United States Patent
Sakai et al.

(10) Patent No.: US 11,869,193 B2
(45) Date of Patent: Jan. 9, 2024

(54) COMPUTER-READABLE RECODING MEDIUM HAVING STORED THEREIN ESTIMATION PROCESSING PROGRAM, ESTIMATION PROCESSING METHOD AND INFORMATION PROCESSING APPARATUS

(71) Applicants: FUJITSU LIMITED, Kawasaki (JP); RIKEN, Wako (JP); NATIONAL CANCER CENTER, Tokyo (JP)

(72) Inventors: Akira Sakai, Kawasaki (JP); Masaaki Komatsu, Wako (JP); Kanto Shozu, Chuo (JP)

(73) Assignees: Fujitsu Limited, Kawasaki (JP); RIKEN, Wako. (JP); NATIONAL CANCER CENTER, Tokyo (JP)

( * ) Notice: Subject to any disclaimer, the term of this patent is extended or adjusted under 35 U.S.C. 154(b) by 403 days.

(21) Appl. No.: 17/144,180

(22) Filed: Jan. 8, 2021

(65) Prior Publication Data

US 2021/0241461 A1 Aug. 5, 2021

(30) Foreign Application Priority Data

Jan. 30, 2020 (JP) .................. 2020-014106

(51) Int. Cl.
*G06T 7/11* (2017.01)
*G06T 7/00* (2017.01)
*G06N 20/00* (2019.01)
*G06N 5/04* (2023.01)

(52) U.S. Cl.
CPC .................. *G06T 7/11* (2017.01); *G06N 5/04* (2013.01); *G06N 20/00* (2019.01); *G06T 7/0012* (2013.01);

(Continued)

(58) Field of Classification Search
CPC ..................... G06T 7/11; G06T 7/0012; G06T 2207/10132; G06T 2207/20081;
(Continued)

(56) References Cited

U.S. PATENT DOCUMENTS

2006/0280348 A1* 12/2006 Smith .................. G06T 7/0012 382/128
2007/0014452 A1* 1/2007 Suresh ................. G06T 7/0012 382/128

(Continued)

OTHER PUBLICATIONS

Olaf Ronneberger et al., "U-Net: Convolutional Networks for Biomedical Image Segmentation", Computer Science Department and BIOSS Centre for Biological Signalling Studies, May 18, 2015, pp. 1-8.

(Continued)

*Primary Examiner* — Edward F Urban
*Assistant Examiner* — Duy Tran
(74) *Attorney, Agent, or Firm* — XSENSUS LLP

(57) ABSTRACT

A method includes: inputting an image of a target to each of a first model for estimating a region of an annular face of the target, a second model for estimating a region in an outer circumference of the annular face and a third model for estimating a region in an inner circumference of the annular face, and outputting a region image, as an estimated region of the annular face, the region image being obtained by synthesizing first, second, and third elements. The first element is a region outputted as a result of the first model for calculating a sum set in the synthesizing, the second element is a region outputted as a result of the second model for calculating a sum set in the synthesizing, and the third element is a region outputted as a result of the third model for calculating a difference set in the synthesizing.

18 Claims, 16 Drawing Sheets

EXAMPLE OF SECTIONAL VIEW OF FETUS THORAX OF ULTRASONOGRAPHIC IMAGE

(52) U.S. Cl.
    CPC ............... *G06T 2207/10132* (2013.01); *G06T 2207/20081* (2013.01); *G06T 2207/30008* (2013.01); *G06T 2207/30044* (2013.01)

(58) Field of Classification Search
    CPC ........... G06T 2207/30008; G06T 2207/30044; G06N 20/00; G06N 5/04
    See application file for complete search history.

(56) References Cited

U.S. PATENT DOCUMENTS

| | | | | |
|---|---|---|---|---|
| 2010/0289878 | A1* | 11/2010 | Sato | H04N 13/239 |
| | | | | 348/46 |
| 2011/0305388 | A1* | 12/2011 | Wedi | G06T 5/50 |
| | | | | 382/165 |
| 2014/0247977 | A1* | 9/2014 | Han | G06T 7/11 |
| | | | | 382/159 |
| 2015/0366500 | A1* | 12/2015 | Aoyagi | G06T 7/0012 |
| | | | | 600/407 |
| 2018/0296169 | A1 | 10/2018 | Ichihara et al. | |
| 2019/0365310 | A1 | 12/2019 | Stidham et al. | |

OTHER PUBLICATIONS

Shozu Kanto et al: "Model-Agnostic Method for Thoracic Wall Segmentation in Fetal Ultrasound Videos", BIOMOLECULES, vol. 10, No. 12, Dec. 17, 2020, 16 pp, XP055812907.
Extended European Search Report dated Jun. 24, 2021, in corresponding European Patent Application No. 21150699.3.

* cited by examiner

EXAMPLE OF SECTIONAL VIEW OF FETUS THORAX
OF ULTRASONOGRAPHIC IMAGE

EXAMPLE OF SEGMENTATION RESULT OF
THORACIC CAGE REGION

COMPUTER-READABLE RECODING MEDIUM HAVING STORED THEREIN ESTIMATION PROCESSING PROGRAM, ESTIMATION PROCESSING METHOD AND INFORMATION PROCESSING APPARATUS

CROSS-REFERENCE TO RELATED APPLICATION

This application is based upon and claims the benefit of priority of the prior Japanese Patent Application No. 2020-014106, filed on Jan. 30, 2020, the entire contents of which are incorporated herein by reference.

FIELD

The present technology relates to a computer-readable recording medium having stored therein an estimation processing program, an estimation process method and an information processing apparatus.

BACKGROUND

There is a need for segmentation of a cross-sectional image of a target of a cylindrical shape in order to perform confirmation of a cross-sectional face of a cylinder or a tube, confirmation of a scan image of a cross section or the like.

For example, as a first method for performing segmentation, a technology is known in which a plurality of points on an outer circumference and an inner circumference of a circle or an ellipse are extracted and a circle or an ellipse that interconnects the extracted points is fitted by a least squares method.

Further, as a second method for performing segmentation, a technology is known in which edging of a cross section in a cross-sectional image is learned using a machine learning method.

[Non-Patent Document 1] Olaf Ronneberger et al., "U-Net: Convolutional Networks for Biomedical Image Segmentation", Computer Science Department and BIOSS Centre for Biological Signalling Studies, University of Freiburg, Germany, laid-open date: May 18, 2015

In the first method described above, the shape of a cross section of a cylinder is limited to a circle or an ellipse. Further, a circle of an inner edge and a circle of an outer edge are liable to cross with each other.

Further, in the second method described above, as a tendency of the machine learning method, an edging region is liable to be interrupted and prior knowledge that a cylindrical shape is handled cannot be utilized.

For the above, in the first and second methods described above, there is the possibility that error decision may occur about the thickness of a cylinder and presence or absence of a hole in a cylindrical face when segmentation of a cross section of a target of a cylindrical shape, for example, of an annular face is performed.

SUMMARY

According to an aspect of the embodiments, a non-transitory computer-readable recording medium having stored therein an estimation processing program that causes a computer to execute a process including: inputting an input-image obtained by photographing a target to each of a first estimation model for estimating a region of an annular face of the target, a second estimation model for estimating a region in an outer circumference of the annular face and a third estimation model for estimating a region in an inner circumference of the annular face, and outputting a region image, as an estimated region of the annular face of the target in the input-image, in response to inputting of the input-image and being used for calculation of a difference set, the region image being obtained by synthesizing a first element, a second element and a third element, the first element being a first region outputted as an estimation result of the first estimation model in response to inputting of the input-image and being used for calculation of a sum set in the synthesizing, the second element being a second region outputted as an estimation result of the second estimation model in response to inputting of the input-image and being used for calculation of a sum set in the synthesizing, the third element being a third region outputted as an estimation result of the third estimation model in response to inputting of the input-image and being used for calculation of a difference set in the synthesizing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
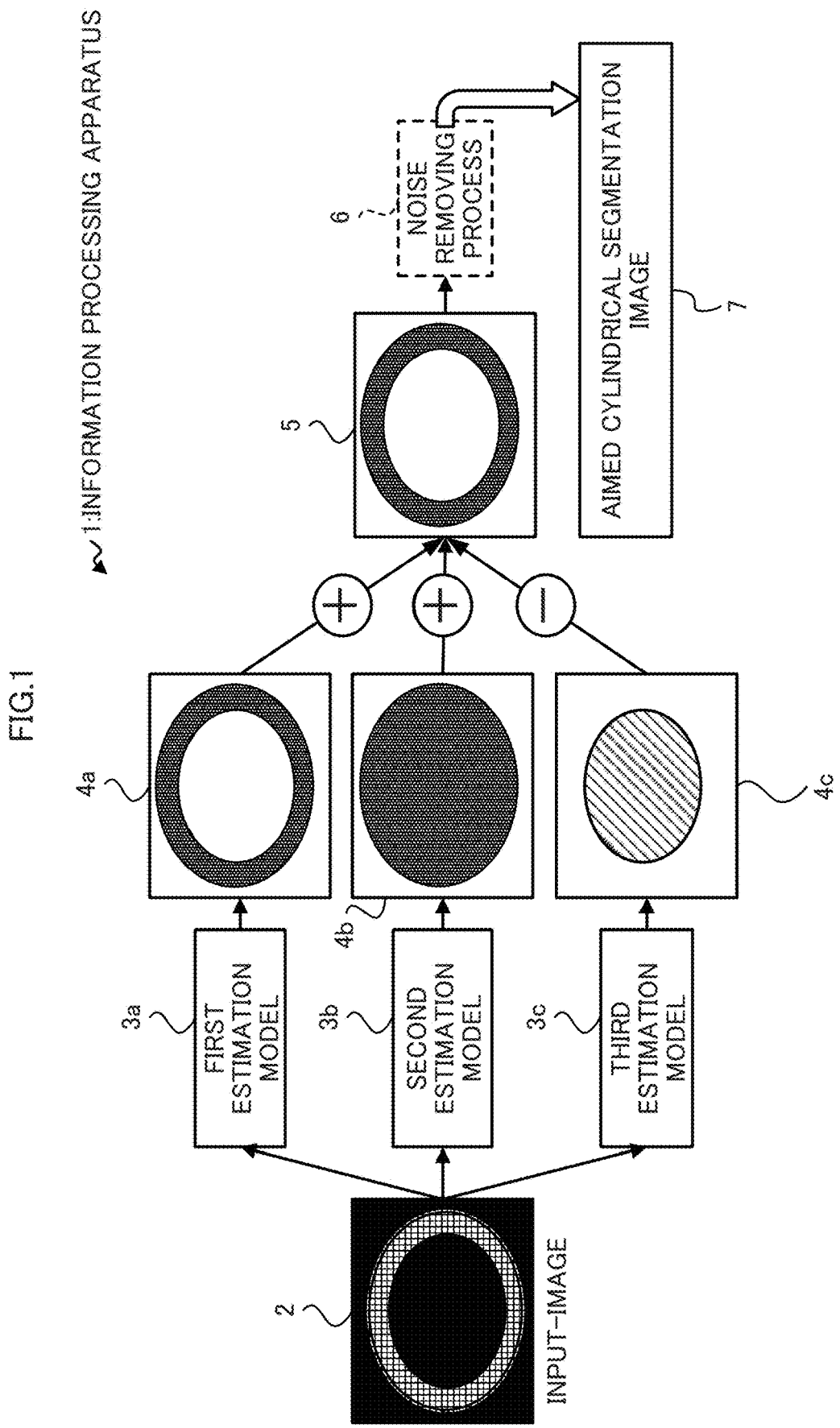
FIG. 1 is a view illustrating an example of an estimation process of an annular face of a target by an information processing apparatus according to an embodiment.

In the following, an embodiment of the present technology is described with reference to the drawings. It is to be noted that the embodiment hereinafter described is illustrative to the end, and there is no intention to eliminate various modifications and applications of the technology not specified in the embodiment hereinafter described. For example, variations and modifications of the present embodiment can be made without departing from the scope of the present technology. It is to be noted that, unless otherwise specified, in the drawings used in the following embodiment, like elements to those in the drawings are denoted by like reference characters.

[1] Embodiment

[1-1] Description of Estimation Process by Information Processing Apparatus

FIG. 1 is a view illustrating an example of an estimation process of an annular face of a target by an information processing apparatus 1 according to an embodiment. It is to be noted that, in the description of FIG. 1, it is assumed that a "target" is, for example, an object of a cylindrical shape. Further, an input image 2 is an image obtained by capturing a cross section of a cylindrical target such that an annular face appears.

As exemplified in FIG. 1, the information processing apparatus 1 can improve the estimation accuracy of an annular face of a target by executing processes of (a) and (b) described below using the input image 2.

(a) The information processing apparatus 1 inputs the input image 2 obtained by capturing a target to a first estimation model 3a for estimating a region of an annular face of the target, a second estimation model 3b for estimating a region in an outer circumference of the annular face and a third estimation model 3c for estimating a region in an inner circumference of the annular face.

It is to be noted that each of the first estimation model 3a, second estimation model 3b and third estimation model 3c may be a neural network in which segmentation of an image is learned already using the machine learning method.

For example, as depicted in FIG. 1, the first estimation model 3a may be trained to perform segmentation for masking a first region 4a of the annular face of the target. Further, the second estimation model 3b may be trained to perform segmentation for masking a second region 4b in an outer circumference of the target, and the third estimation model 3c may be trained to perform segmentation for masking a third region 4c in an inner circumference of the target.

(b) The first region 4a outputted as an estimation result of the first estimation model 3a is determined as a first element to be used for calculation of a sum set; the second region 4b outputted as an estimation result of the second estimation model 3b is determined as a second element to be used for calculation of the sum set; and the third region 4c outputted as an estimation result of the third estimation model 3c is determined as a third element to be used for calculation of a difference set. The information processing apparatus 1 outputs a region obtained by combining the first element, second element and third element as a region 5 estimated as the annular face of the target in the input image 2.

In the example of FIG. 1, a masked region in each of the first region 4a of the annular face of the target and the second region 4b inside the outer circumference of the annular face are indicated in shades, and a masked region in the third region 4c inside the inner circumference of the annular face is indicated by slanting lines. In the example of FIG. 1, "+" (plus) in a circle frame indicates arithmetic operation of a sum set and "−" (minus) in a circle frame indicates arithmetic operation of a difference set.

It is to be noted that the region 5 may be image data at least including segmentation of a portion estimated as an annular face. Further, as exemplified in FIG. 1, the information processing apparatus 1 may execute a noise removing process 6 for the region 5 to remove noise and output a segmentation image 7 of a cylindrical shape.

In this manner, with the information processing apparatus 1 according to the embodiment, estimation of an annular face of a target in the input image 2 can be performed even if the cross-sectional shape of a cylinder that is a target is not a determined shape such as a circle or an ellipse.

Further, by outputting the region 5 obtained by combining the first region 4a of the annular face of the target, second region 4b inside the outer circumference of the annular face and third region 4c inside the inner circumference of the annular face, which are regarded as the first element, second element and third element, respectively, it is possible to make interruption or missing less likely to occur in an estimation result of the annular face.

Accordingly, the accuracy in estimation of an annular face of a target can be improved. Consequently, for example, decision of the thickness of the annular face of the target, decision of the presence or absence of a hole in the annular face and so forth can be performed accurately.

Figure 2:
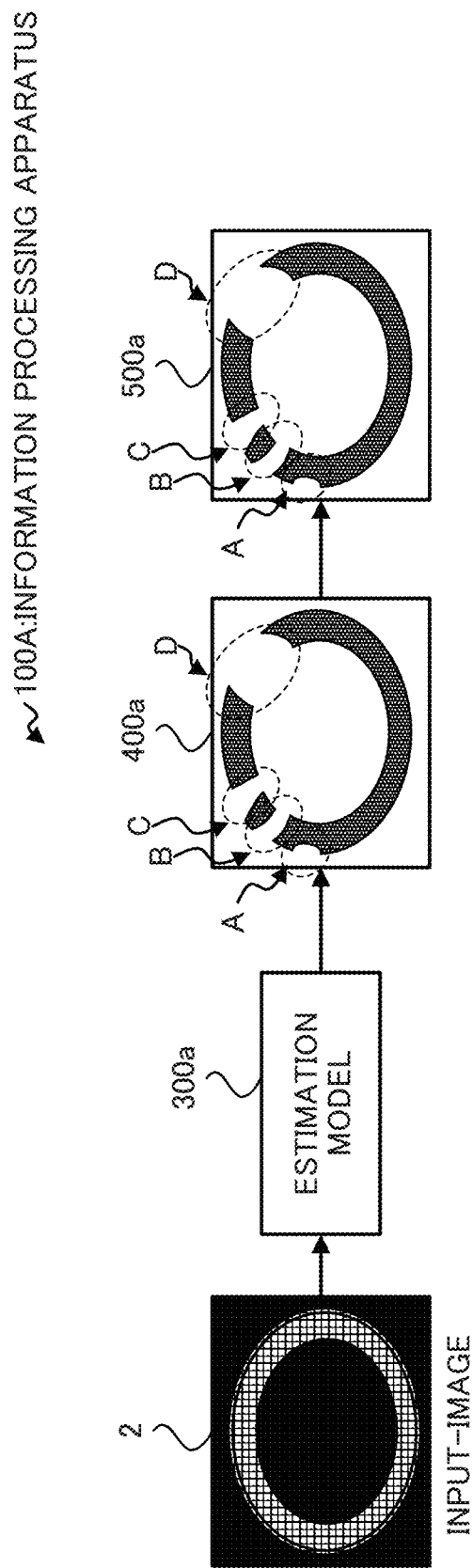
FIGS. 2 and 3 are views illustrating information processing apparatus according to comparative examples.
Figure 3:
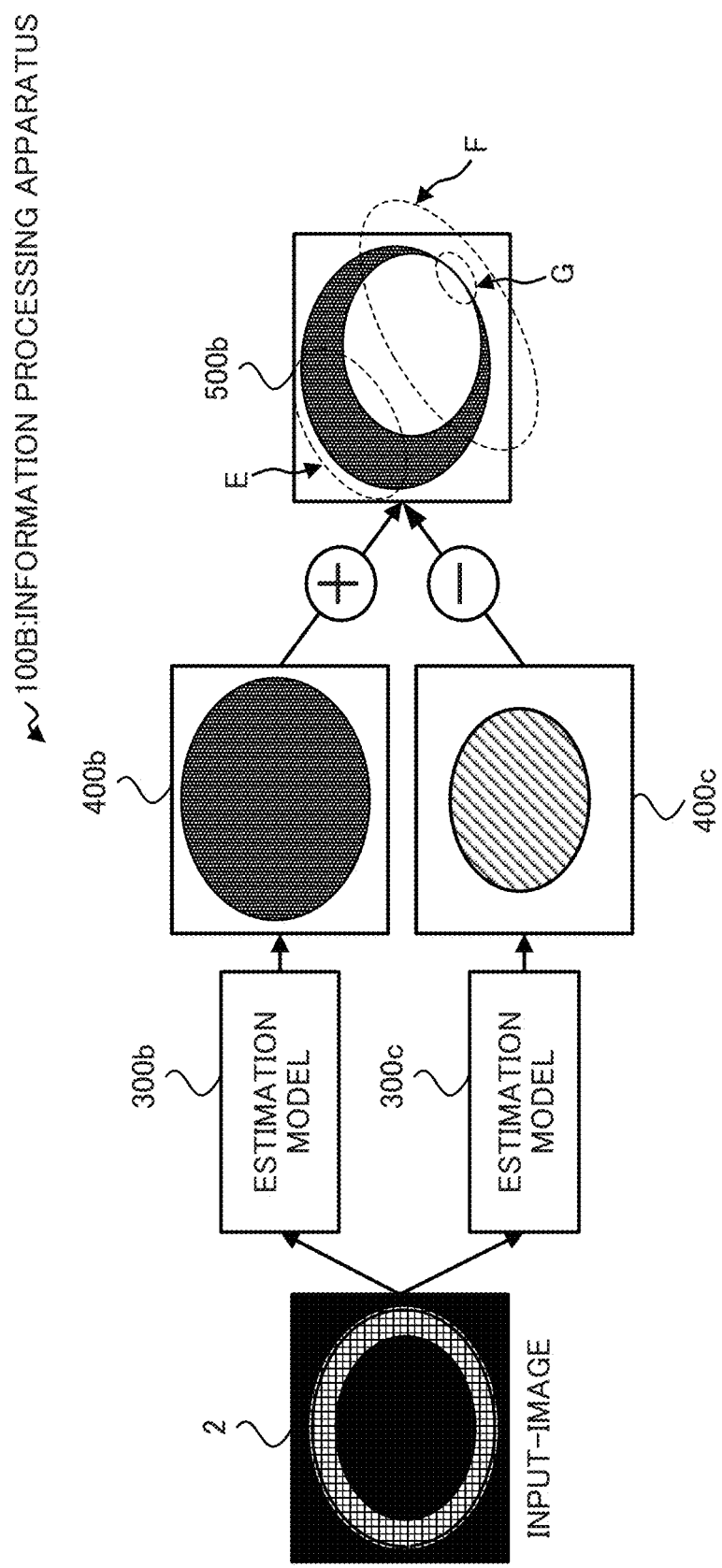

FIGS. 2 and 3 are views illustrating information processing apparatus 100A and 100B according to comparative examples, respectively.

In the comparative example depicted in FIG. 2, a case is indicated in which, by the information processing apparatus 100A, a region 400a outputted as an estimation result of an estimation model 300a being acquired in response to inputting of the input image 2 and estimating a region of an annular face of a target is outputted as a region 500a. As in the example of FIG. 2, a segmented cylindrical shape in the region 400a sometimes suffers from missing as indicated by reference characters A to D. Since such missing portions remain in the region 500a estimated as an annular face of a target in the input image 2, there is the possibility that the shape of the target is not recognized as a cylindrical shape.

In the comparative example depicted in FIG. 3, a case is indicated in which, by the information processing apparatus 100B, a region obtained by excluding a region 400c outputted as an estimation result of an estimation model 300c for estimating a region in an inner circumference of an annular face from a region 400b outputted as an estimation result of an estimation model 300b being acquired in response to inputting of the input image 2 and estimating a region in an outer circumference of the annular face is outputted as a region 500b. As in the example of FIG. 3, when the region 400c is excluded from the region 400b, displacement sometimes occurs in position of one or both of the regions 400b and 400c. In this case, an estimation result of the annular face of the region 500b sometimes contains the thickness of the annular face erroneously determined as indicated by reference characters E and F or interruption or missing as indicated by reference character G, resulting in failure in recognizing the shape of the annular face as a cylindrical shape.

In this manner, in the case where one or two regions outputted as an estimation result of an estimation model are used, there is the possibility that accuracy in estimation of the annular face of the target may degrade.

In contrast, with the information processing apparatus 1 according to the embodiment, a missing portion that may possibly appear in the first region 4a estimated as an annular face can be compensated for (complemented) by the second region 4b estimated as inside an outer circumference of the annular face.

Further, by subtracting a central portion of the annular face from the second region 4b on the basis of the third region 4c estimated as inside the inner circumference of the annular face, for example, it can be avoided by the noise removing process 6 that the inner circumference of the annular face is filled.

Accordingly, with the information processing apparatus 1 according to the embodiment, accuracy degradation in estimation of an annular face of a target, which may possibly occur in the comparative examples depicted in FIGS. 2 and 3 can be suppressed, and, in other words, the accuracy in estimation of an annular face of a target can be improved.

It is to be noted that several patterns are conceivable in the combination order of the first region 4a, the second region 4b, and the third region 4c. The patterns are hereinafter described.

[1-2] Example of Configuration of Embodiment

Figure 4:
FIG. 4 is a view depicting an example of a cross section of a fetus thorax of an ultrasonographic image.

In the following description, a case is taken as an example in which an estimation process by the information processing apparatus 1 is utilized in detection of the thoracic cage in ultrasonic image diagnosis. As exemplified in FIG. 4, a region in an echo image from the skin to a rib of the fetus thorax is a part called "thoracic cage". In the case where the fetus has some congenital disease, swelling due to ascites or depression due to atrophy of an organ appears.

Figure 5:
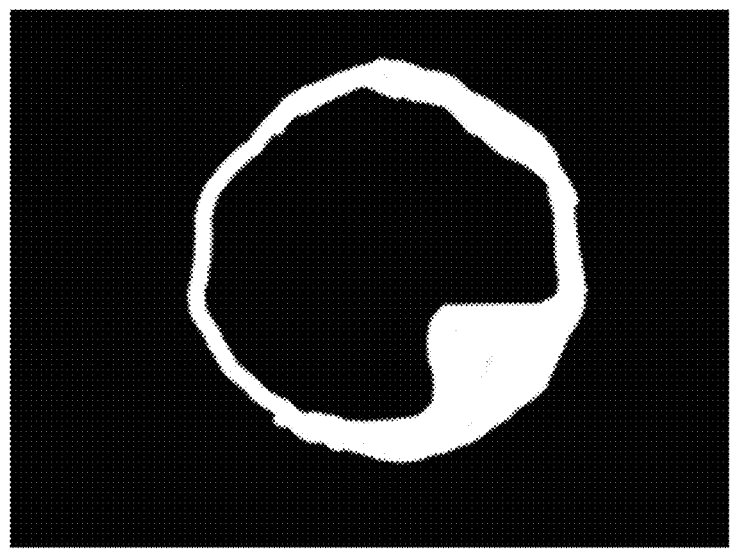
FIG. 5 is a view depicting an example of a segmentation result of a thoracic cage region.

In decision of such congenital disease, decision of the thickness of the thoracic cage, decision about whether or not there is a hole in the thoracic cage and like decisions are performed. For this purpose, it is important in fetus ultrasonographic diagnosis to perform segmentation of the region of the thoracic cage including an inner circumference and an outer circumference in a unit of a pixel as exemplified in FIG. 5.

Figure 6:
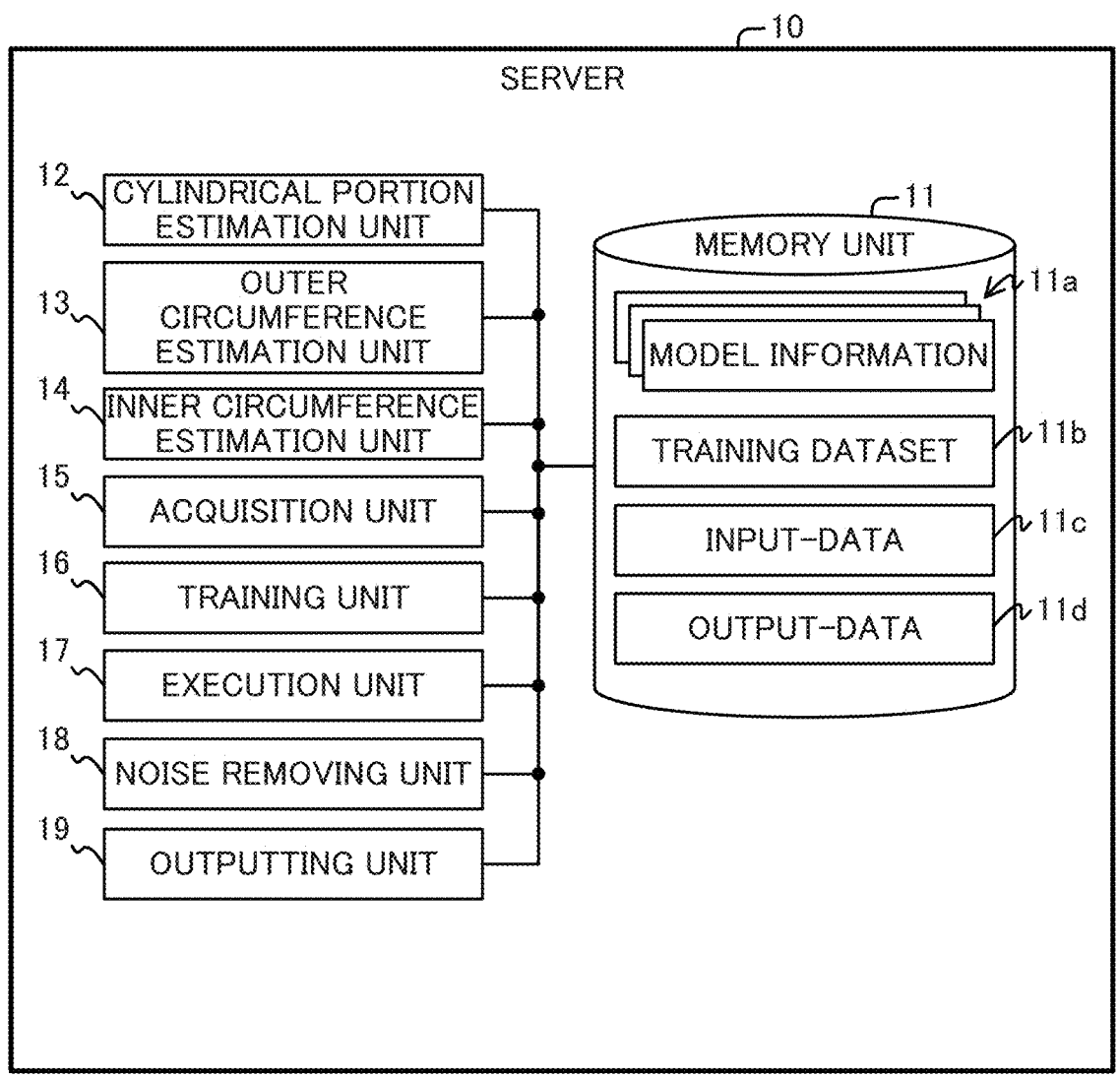
FIG. 6 is a block diagram depicting an example of a functional configuration of a server according to an embodiment.

Therefore, it is assumed that, in the description of the embodiment, the object is a fetus and the image for which segmentation is performed is an ultrasonic image such as an echo image in which the thoracic cage of the fetus is captured and besides the annular face that is a segmentation target is a thoracic cage of a fetus FIG. 6 is a block diagram depicting an example of a functional configuration of a server 10 according to an embodiment. The server 10 is an apparatus that estimates an annular face of a target and is an example of the information processing apparatus 1 depicted in FIG. 1.

As depicted in FIG. 6, the server 10 may illustratively include a memory unit 11, a cylindrical portion estimation unit 12, an outer circumference estimation unit 13, an inner circumference estimation unit 14, an acquisition unit 15, a training unit 16, an execution unit 17, a noise removing unit 18 and an outputting unit 19. In the following description, the cylindrical portion estimation unit 12, the outer circumference estimation unit 13 and the inner circumference estimation unit 14 are sometimes referred to collectively as "estimation units 12 to 14".

The memory unit 11 is an example of a storage region and stores various kinds of information to be used in learning, execution (estimation), outputting and so forth of the cylindrical portion estimation unit 12, the outer circumference estimation unit 13 and the inner circumference estimation unit 14. As depicted in FIG. 6, the memory unit 11 may illustratively be capable of storing a plurality of pieces of model information 11a, a training dataset 11b, input data 11c and output data 11d.

The cylindrical portion estimation unit 12 is an example of the first estimation model 3a depicted in FIG. 1 and estimates a region of an annular face of a target, for example, in response to inputting of an image (image data) obtained by imaging the target.

The outer circumference estimation unit 13 is an example of the second estimation model 3b depicted in FIG. 1 and estimates a region in an outer circumference of the annular face of the target, for example, in response to inputting of the image (image data).

The inner circumference estimation unit 14 is an example of the third estimation model 3c depicted in FIG. 1 and estimates a region in an inner circumference of the annular face of the target, for example, in response to inputting of the image (image data).

The estimation units 12 to 14 may each be a neural network that performs segmentation of an image using a machine learning method, and as one example, the U-Net is applicable. It is to be noted that the estimation units 12 to 14 are not limited to the U-Net but may each be a different neural network that executes Semantic Segmentation or a neural network that uses a segmentation method other than the Semantic Segmentation.

Information of the network structure for implementing the estimation units 12 to 14, various parameters and so forth may be stored as model information 11a, for example, for each of the estimation units 12 to 14, in the memory unit 11.

The acquisition unit 15 acquires information to be used in training and execution of the estimation units 12 to 14, for example, from a computer not depicted.

For example, the acquisition unit 15 may acquire a training dataset 11b to be used in training of the estimation units 12 to 14 and stores the training dataset 11b into the memory unit 11.

The training dataset 11b is an example of a dataset of training data including a training image obtained by imaging a training target and annotation data indicative of a region corresponding to the training target in the training image.

Figure 7:
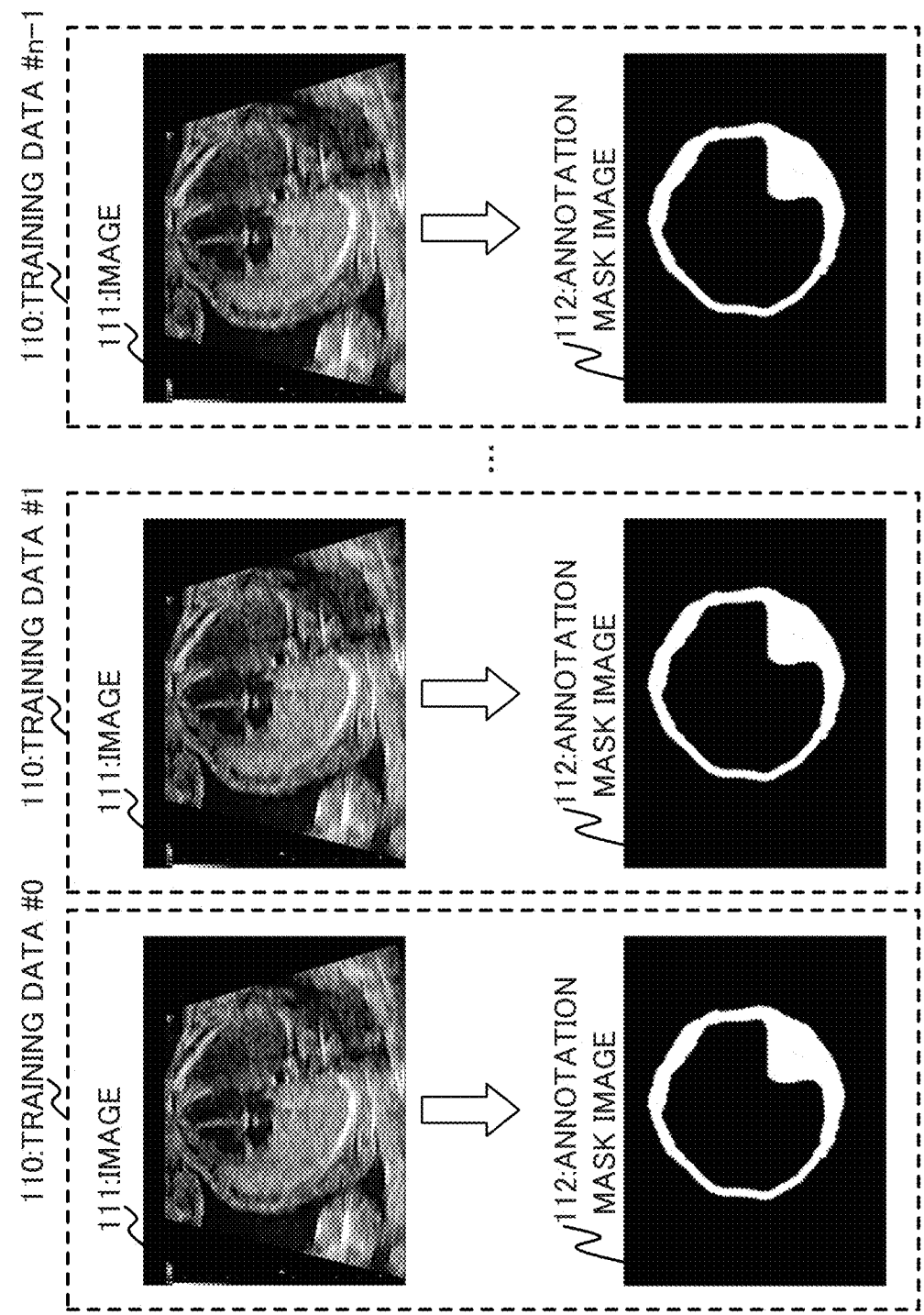
FIG. 7 is a view depicting an example of a training dataset.

For example, the training dataset 11b may include n (n is an integer equal to or greater than 2) training data 110 as depicted in FIG. 7. Each of the training data 110 may include an image 111 obtained by imaging an annular face of a training target and an annotation mask image (hereinafter referred to sometimes as "mask image") 112 as correct answer data of segmentation of the image 111.

The image 111 is an example of a training image and may be an echo image obtained by imaging the thoracic cage of a fetus that is an example of the training target. Each of the echo images of the plurality of training data 110 may be a frame cut out in a time series (for example, t=0 to (n−1)) from a series of echo videos. It is to be noted that the images lll may be frames cut out from moving images different from each other or may be images captured as still images.

The annotation mask image 112 is an example of annotation data and is an image obtained by masking an annular face (in the example of FIG. 7, the "thoracic cage") of a segmentation target in an image 111 of the training data 110, as exemplified in FIG. 7. It is to be noted that "mask" signifies, for example, displaying that a region of a mask target in a mode distinguishable from a region that is not a mask target, and, as an example, "mask" may signify that a region of a mask target is filled with a predetermined color (a predetermined color is set to pixels in a region of a mask target). In the example of FIG. 7, a masked region, in other words, a region corresponding to the thoracic cage, is indicated by painting in white while the other region, in other words, any region other than the thoracic cage, is indicated by paining in black.

In one embodiment, the mask image 112 is an example of first annotation data and is correct answer data used in machine learning for the cylindrical portion estimation unit 12.

Further, the acquisition unit 15 may acquire input data 11c to be used in an estimation process by the estimation units 12 to 14 and store the acquired input data 11c into the memory unit 11.

Figure 8:
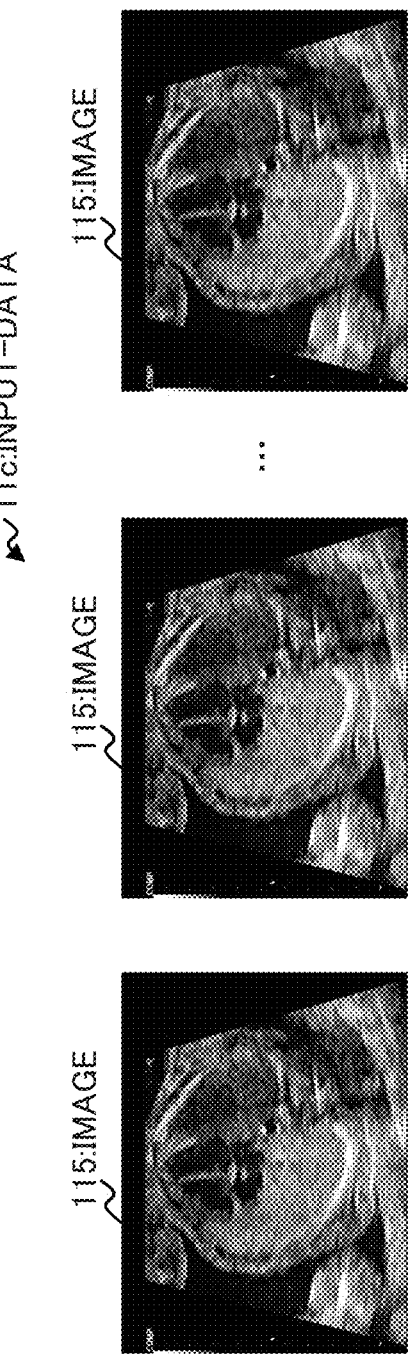
FIG. 8 is a view depicting an example of input data.

The input data 11c is an image set including one or more input images and may be a moving image such as, for example, a video including a plurality of frames or the like. In one embodiment, the input data 11c may be an echo image including multiple images 115 that are echo images or the like as depicted in FIG. 8. Each image 115 is an example of an input image inputted to the estimation units 12 to 14 in an estimation process.

The training unit 16 is an example of a training execution unit and performs training of the estimation units 12 to 14 individually using the training dataset 11b acquired by the acquisition unit 15.

Figure 9:
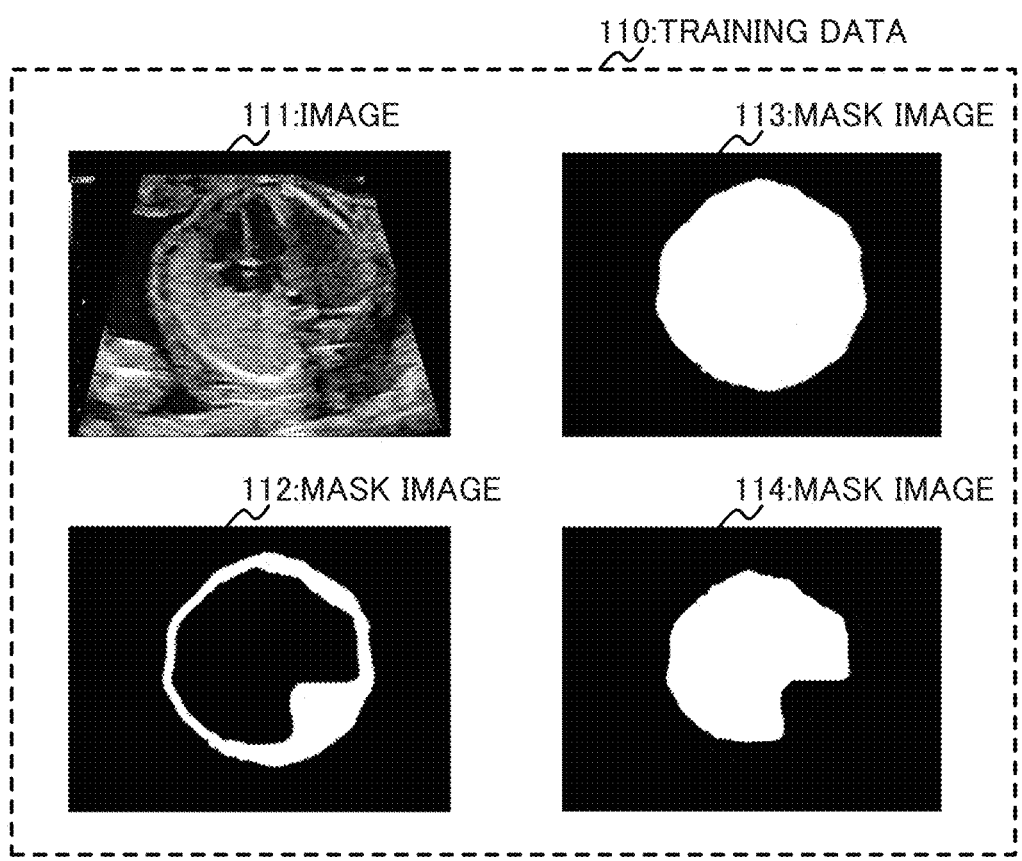
FIG. 9 is a view depicting an example of a mask image produced by a training unit.

It is to be noted that the training unit 16 may generate multiple annotation mask images 113 and 114 as depicted in FIG. 9 on the basis of the mask image 112 included in the training dataset 11b.

The mask image 113 is an example of second annotation data that is obtained by processing the mask image 112 so as to indicate a region in an outer circumference of the annular face of the training target in the training image and is correct answer data that is used in machine learning for the outer circumference estimation unit 13.

For example, the training unit 16 may generate a mask image 113 in which the overall area in the outer circumference is masked as depicted in FIG. 9 by further masking the inside of the inner circumference for the mask image 112 in which the annular face is masked.

The mask image 114 is an example of third annotation data obtained by processing the mask image 112 so as to indicate a region in the inner circumference of the annular face of the training target in the training image and is correct answer data used in machine learning for the outer circumference estimation unit 13.

For example, the training unit 16 may generate a mask image 114 in which the overall area inside the inner circumference is masked by cancelling the mask for the annular face and masking the inside of the inner circumference in the mask image 112 in which the annular face is masked. It is to be noted that the training unit 16 may generate the mask image 114 by calculating a difference set by excluding the mask image 112 from the mask image 113, for example, by excluding a set of pixels in the mask portion of the mask image 112 from a set of pixels in the mask portion of the mask image 113.

As above, the training unit 16 may generate mask images 113 and 114 for each training data 110 included in the training dataset 11b and place the generated mask images 113 and 114 into the corresponding training data 110.

It is to be noted that, in the case where each training data 110 includes an image 111 and mask images 112 to 114, generation of the mask images 113 and 114 by the training unit 16 may be omitted.

Figure 10:
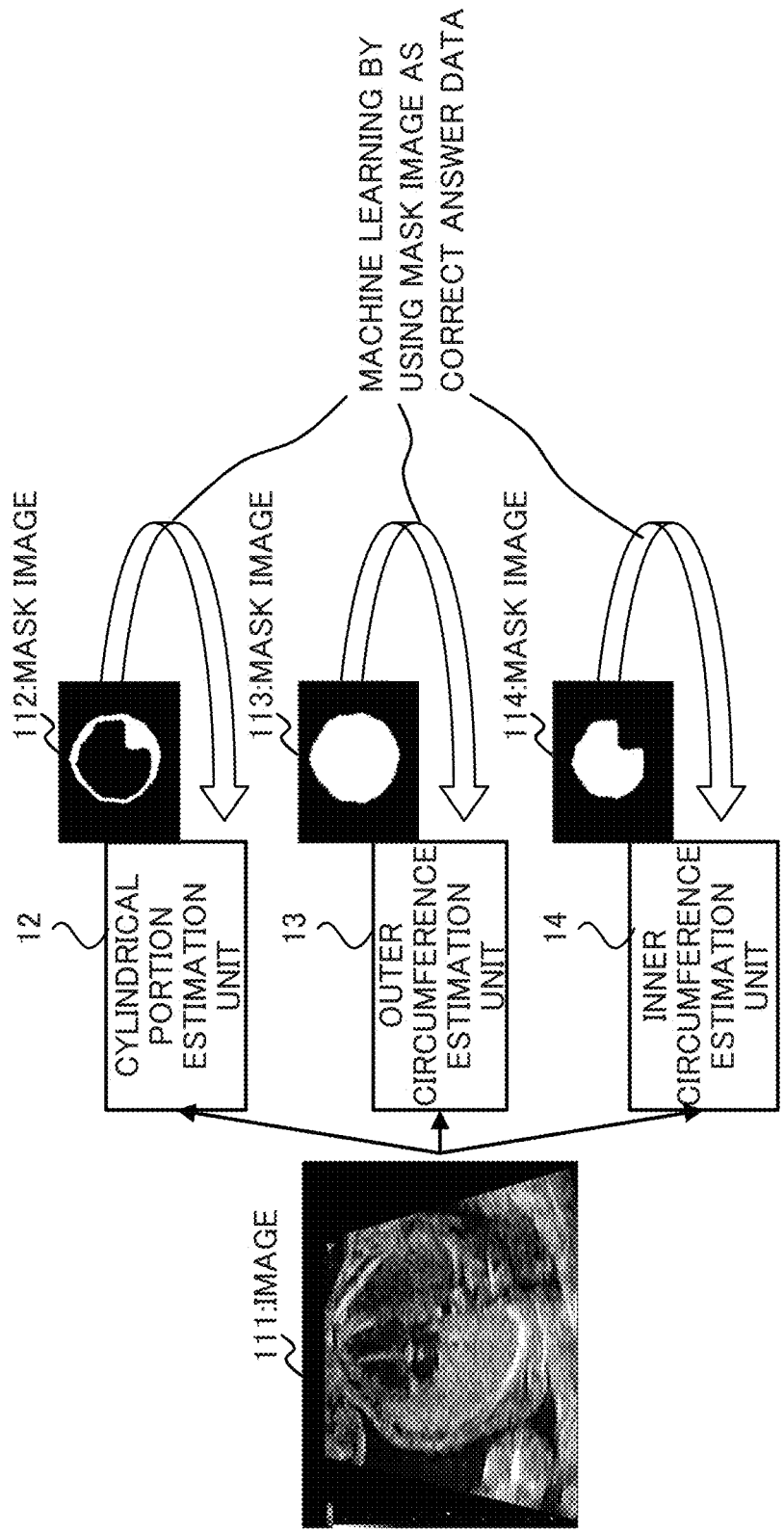
FIG. 10 is a view illustrating an example of a machine learning process of an estimation unit by the learning unit.

FIG. 10 is a view illustrating an example of a machine learning process for the estimation units 12 to 14 by the training unit 16. As depicted in FIG. 10, the training unit 16 inputs individually an image 111 to the estimation units 12 to 14. Then, the training unit 16 executes machine learning for the cylindrical portion estimation unit 12 on the basis of a mask image 112 and an estimation result outputted from the cylindrical portion estimation unit 12 and acquired in response to inputting of the image 111. Further, the training unit 16 executes machine learning for the outer circumference estimation unit 13 on the basis of a mask image 113 and an estimation result outputted from the outer circumference estimation unit 13 and acquired in response to inputting of the image 111. Furthermore, the training unit 16 executes machine learning for the inner circumference estimation unit 14 on the basis of a mask image 114 and an estimation result outputted from the inner circumference estimation unit 14 and acquired in response to inputting of the image 111.

By the machine learning process for the estimation units 12 to 14 by the training unit 16, the cylindrical portion estimation unit 12 is trained such that it performs segmentation of masking a region of an annular face of a target in an inputted image similarly as in the mask image 112. Further, the outer circumference estimation unit 13 is trained such that it performs segmentation of masking a region inside the outer circumference of the target similarly as in the mask image 113. Furthermore, the inner circumference estimation unit 14 is trained such that it performs segmentation of masking a region in the inner circumference of the target similarly as in the mask image 114.

As the machine learning method of the estimation units 12 to 14 using the correct answer data (mask images 112 to 114), various known methods may be adopted. As an example, a back propagation process for determining parameters to be used in processing in a forward propagation process may be executed in order to reduce the value of an error function obtained on the basis of the mask images 112 to 114 and an estimation result obtained by a forward propagation process of the estimation units 12 to 14 in response to inputting of the image 111. Then, in the machine learning process, an update process of updating variables such as a weight may be executed on the basis of a result of the back propagation process.

Such parameters, variable and so forth may be included in the model information 11a, and the training unit 16 may update the model information 11a in response to execution of the machine learning process.

The training unit 16 may repeatedly execute the machine learning processes individually of the estimation units 12 to 14, for example, using multiple training data 110 included in the training dataset 11b until the number of repetitions (iterations), the accuracy degree or the like reaches a threshold value therefor. It is to be noted that each of the estimation units 12 to 14 for which learning is completed is an example of a trained model.

According to the training unit 16, an annotation mask image 113 that is learning data of the outer circumference estimation unit 13 and an annotation mask image 114 that is learning data of the inner circumference estimation unit 14 can be generated using an annotation mask image 112 of an annular face such as a closed cylinder.

Accordingly, the processing load of generation of the training dataset 11b in the providing source of the training dataset 11b can be reduced and the consumption amount of the storage region for the training dataset 11b can be reduced.

The execution unit 17 executes an estimation process of segmentation of a target for the input data 11c using the estimation units 12 to 14 trained by the training unit 16.

Figure 11:
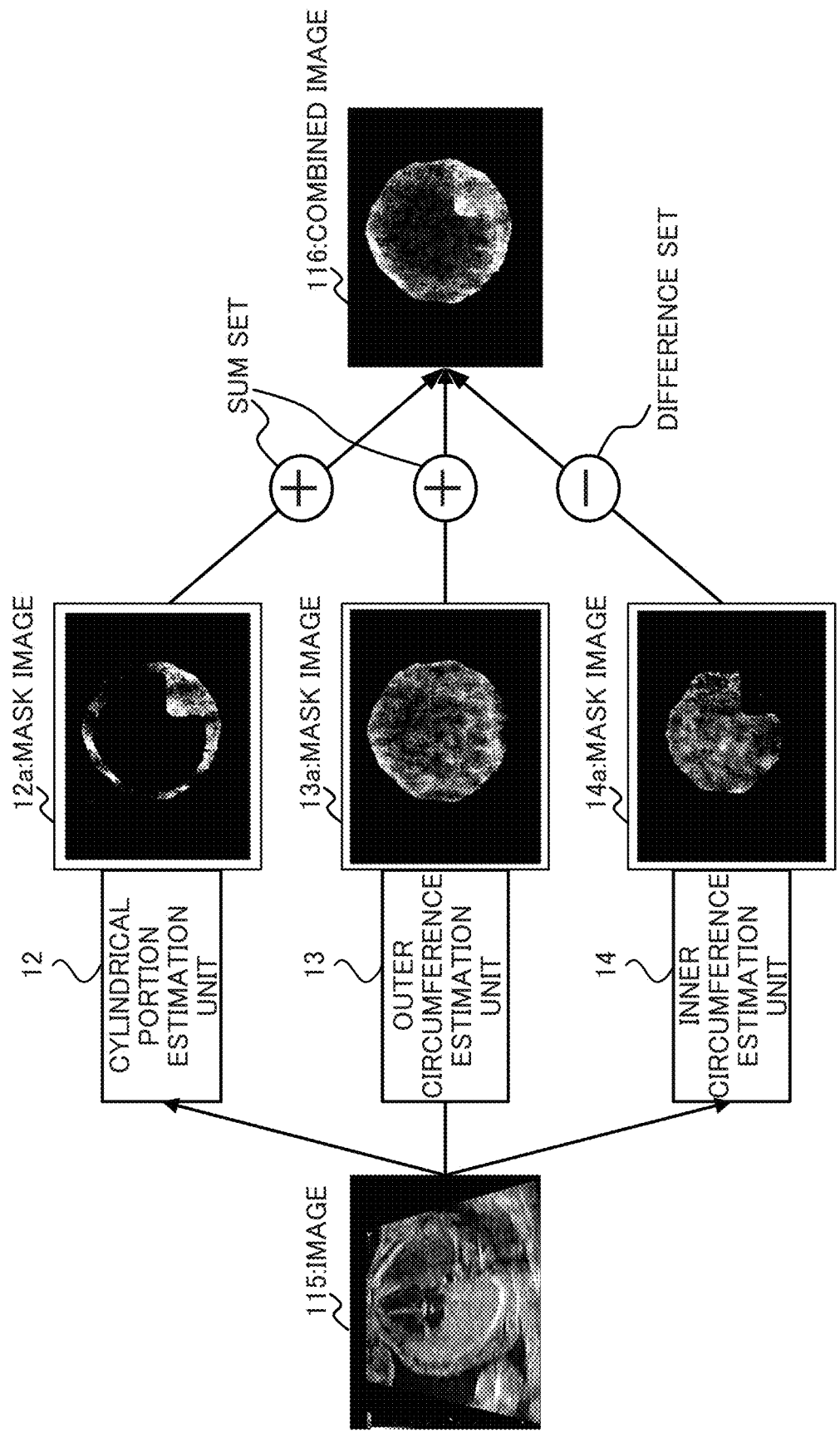
FIG. 11 is a view illustrating an example of an estimation process by an execution unit.

FIG. 11 is a view illustrating an example of an estimation process by the execution unit 17. The estimation process may include an acquisition process of an estimation result image (mask image) outputted from each of the estimation units 12 to 14 and a combining process of the acquired estimation result images.

As depicted in FIG. 11, the execution unit 17 extracts, in an acquisition process, an image 115 included in input data 11c and inputs the same image 115 to each of the cylindrical portion estimation unit 12, the outer circumference estimation unit 13 and the inner circumference estimation unit 14.

In other words, the execution unit 17 is an example of an image inputting unit for inputting an image 115 to each of the cylindrical portion estimation unit 12, the outer circumference estimation unit 13 and the inner circumference estimation unit 14.

Then, the execution unit 17 acquires a mask image 12a that is an estimation result image outputted from the cylindrical portion estimation unit 12, a mask image 13a that is an estimation result image outputted from the outer circumference estimation unit 13 and a mask image 14a that is an estimation result image outputted from the inner circumference estimation unit 14.

The mask image 12a for the annular face is an example of a first region outputted as an estimation result of the cylindrical portion estimation unit 12. The mask image 13a inside the outer circumference is an example of a second region outputted as an estimation result of the outer circumference estimation unit 13. The mask image 14a inside the inner circumference is an example of a third region outputted as an estimation result of the inner circumference estimation unit 14.

The execution unit 17 combines (synthesizes), in the combining process, the acquired mask image 12a of the annular face, mask image 13a inside the outer circumference and mask image 14a inside the inner circumference to generate a combined image 116. The combined image 116 is an example of a region that is estimated as an annular face of a target in the image 115 and may be image data at least including segmentation of the portion estimated as the annular face.

Here, the execution unit 17 may utilize, for example, the mask image 12a of the annular face as a first element to be used for calculation of a sum set; utilize the mask image 13a inside the outer circumference as a second element to be used for calculation of the sum set; and utilize the mask image 14a inside the inner circumference as a third element to be used for calculation of a difference set.

If the set of pixels in the mask portion of the mask image 12a of the annular face is represented by C and the set of pixels in the mask portion of the mask image 13a inside the outer circumference is represented by O and besides the set of pixels in the mask portion of the mask image 14a inside the inner circumference is represented by I, then the combining process described above may be represented by the following expression (1).

$$\text{combined image } 116 = (C \cup O)/I \tag{1}$$

Here, in the expression (1) above, "U" signifies the sum (sum set), and "/" signifies the difference (difference set).

The execution unit 17 may output, as a combined image 116, a region obtained by excluding the mask image 14a inside the inner circumference from the region of the sum set of the mask image 12a of the annular face and the mask image 13a inside the outer circumference by calculating the above expression (1).

Alternatively, the combining process may be represented by the following expression (2).

$$\text{combined image } 116 = (O/I) \cup C \tag{2}$$

The execution unit 17 may output, as a combined image 116, a region of the sum set of the mask image 12a of the annular face and a region obtained by excluding the mask image 14a inside the inner circumference from the mask image 13a inside the outer circumference by calculating the above expression (2).

The execution unit 17 may execute the combining process using at least one of the expression (1) and the expression (2) given above. It is to be noted that, in the case where the execution unit 17 executes both the combining process using the expression (1) and the combining process using the expression (2), it may output both combined images 116 in a distinguishable fashion or may further combine the two combined images 116 (for example, calculate a sum set) and output a result of the combining process. By executing the both combining processes, the possibility that a combining process suitable for the input data 11c can be performed can be enhanced and the accuracy of the estimation process can be improved.

The execution unit 17 may extract a plurality of images 115 included in the input data 11c described hereinabove in order, for example, from a top frame to a last frame in a video and perform the estimation process on each extracted image 115. Alternatively, the execution unit 17 may input a set of two or more images 115 from among the multiple images 115 to each of the estimation units 12 to 14 such that an estimation process is executed.

Here, as exemplified in FIG. 11, in the mask image 12a of the annular face, the "cylinder" suffers from missing (see FIG. 2). Especially an echo image like the image 115 has a characteristic that, although the movement of a target is small, it includes much noise. By an influence of such noise and so forth, the possibility that missing may occur with an annular portion of the mask image 12a is high.

In contrast, according to the combining process using the expression (1) or the expression (2) given hereinabove, the missing is filled by the combination with the mask image 13a inside the outer circumference. Accordingly, the execution unit 17 can output a combined image 116 that indicates a shape of a "cylinder" without being interrupted.

Further, as described hereinabove with reference to FIG. 3, in the case where a set of pixels of the mask portion of a region 400c inside the inner circumference is excluded from a set of pixels of the mask portion of a region 400b inside the outer circumference (a difference set is executed), the "cylinder" in a region 500b sometimes suffers from missing or the like due to positional displacement.

In contrast, according to the combining process using the expression (2) given hereinabove, even if missing or the like is caused by (O/I), the missing is filled by combination with the mask image 12a of the annular face. Accordingly, the execution unit 17 can output a combined image 116 having a shape of a "cylinder" without being interrupted. Meanwhile, according to the combination process using the expression (1) above, missing that is caused by positional displacement upon execution of a difference set is interpolated relying upon a noise processing step by the noise removing unit 18 to be described below. Accordingly, in the case where the influence of positional displacement is great in the combining process using the expression (1) above, the combining process using the expression (2) above may be adopted.

Further, since the execution unit 17 combines estimation result images individually of the estimation units 12 to 14 to generate a combined image 116, also in the case where the shape of the annular face of the target is not a defined shape like a circle or an ellipsis, the annular face of the target can be estimated accurately.

The noise removing unit 18 outputs a segmentation image 117, which is a result when, for a combined image 116 estimated as an annular face of the target in the image 115, a noise removing process of removing noise included in the combined image 116 is performed, to the outputting unit 19. As the noise removing unit 18, for example, various imaging process filters such as, for example, a morphology filter may be utilized.

Figure 12:
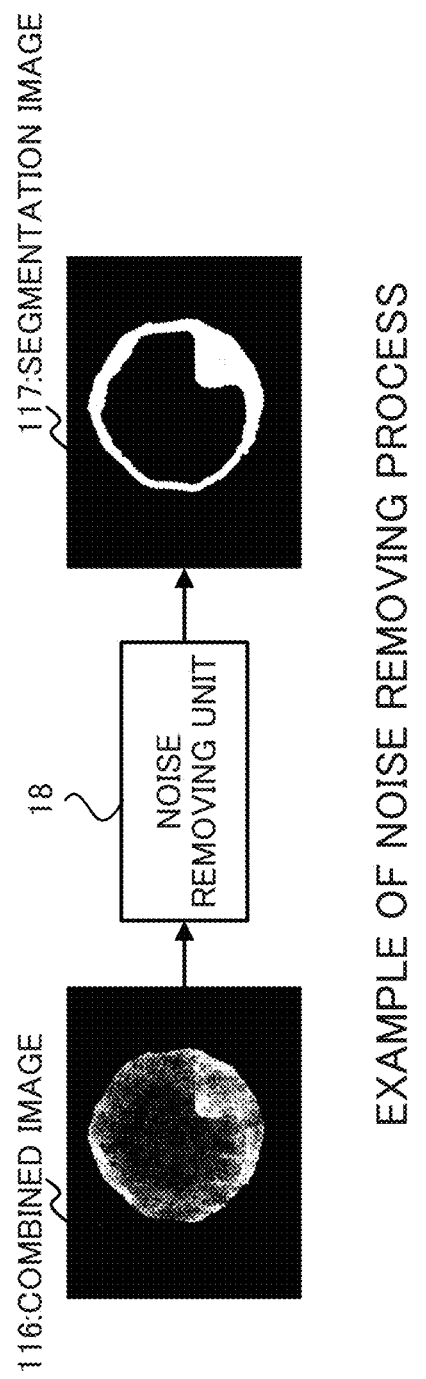
FIG. 12 is a view illustrating an example of a noise removing process by a noise removing unit.

By the noise removing process by the noise removing unit 18, noise in the combined image 116 can be removed as exemplified in FIG. 12, and a segmentation image 117 in which the boundary between the annular face and the other non-annular face is made clear as exemplified in FIG. 12.

It is to be noted that also a configuration that the server 10 does not include the noise removing unit 18 may be permitted. In this case, the execution unit 17 may output the combined image 116 to the outputting unit 19.

The outputting unit 19 outputs (accumulates) a combined image 116 or a segmentation image 117 inputted from the execution unit 17 or the noise removing unit 18 to (into) the memory unit 11 and may produce output data 11d on the basis of a plurality of accumulated segmentation images 117.

Figure 13:
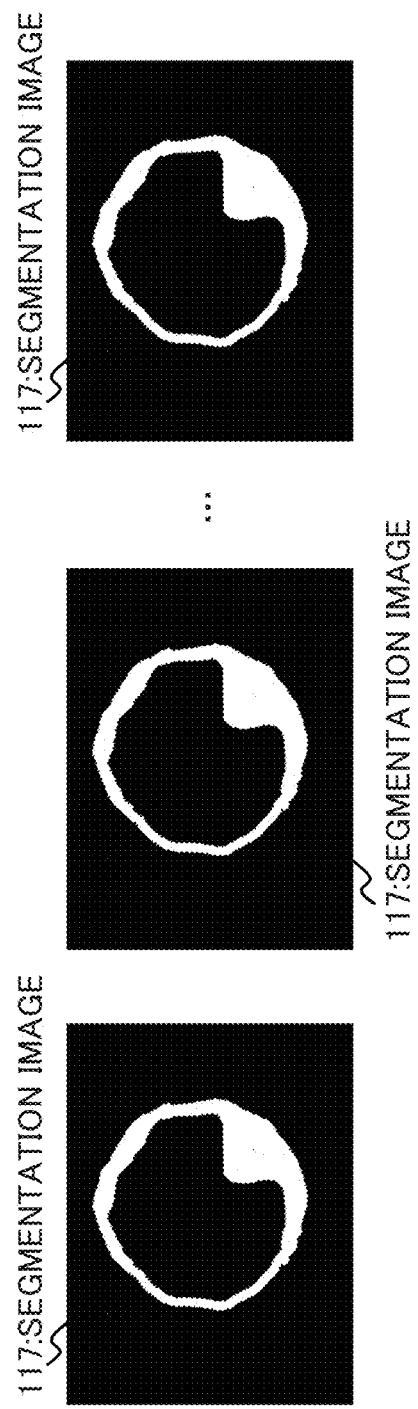
FIG. 13 is a view depicting an example of output data.

The output data 11d is an image set including one or more combined images 116 or segmentation images 117, in other words, one or more output images, and may be, for example, a moving image of a video or the like including multiple frames. In one embodiment, the outputting unit 19 may output a video in which combined images 116 or segmentation images 117 (in the example of FIG. 13, segmentation images 117) are coupled as frames in a time series as exemplified in FIG. 13.

It is to be noted that the outputting unit 19 may transmit the output data 11d, for example, to a computer not depicted.

As described above, each of the execution unit 17 and the outputting unit 19 is an example of a region outputting unit that outputs, as a region estimated as an annular face of a target in the image 115, a region obtained by combining first, second and third elements, the first element being the mask image 12a and being to be used for calculation of a sum set; the second element being the mask image 13a and being to be used for calculation of the sum set; and the third element being the mask image 14a and being to be used for calculation of a difference set.

According to another aspect, the execution unit 17 and the outputting unit 19 collectively serve as an example of a region outputting unit that outputs a region obtained by excluding the mask image 14a from the region of the sum set of the mask image 12a and the mask image 13a as a region estimated as an annular face of a target in the image 115.

According to a further aspect, the execution unit 17 and the outputting unit 19 collectively serve as an example of a region outputting unit that outputs a region obtained by excluding the mask image 14a from the region of the sum set of the mask image 12a and the mask image 13a as an annular face of a target in the image 115.

[1-3] Example of Operation

Now, an example of operation of the server 10 configured in such a manner as described above is described with reference to FIGS. 14 and 15.

[1-3-1] Example of Operation of Training Phase

Figure 14:
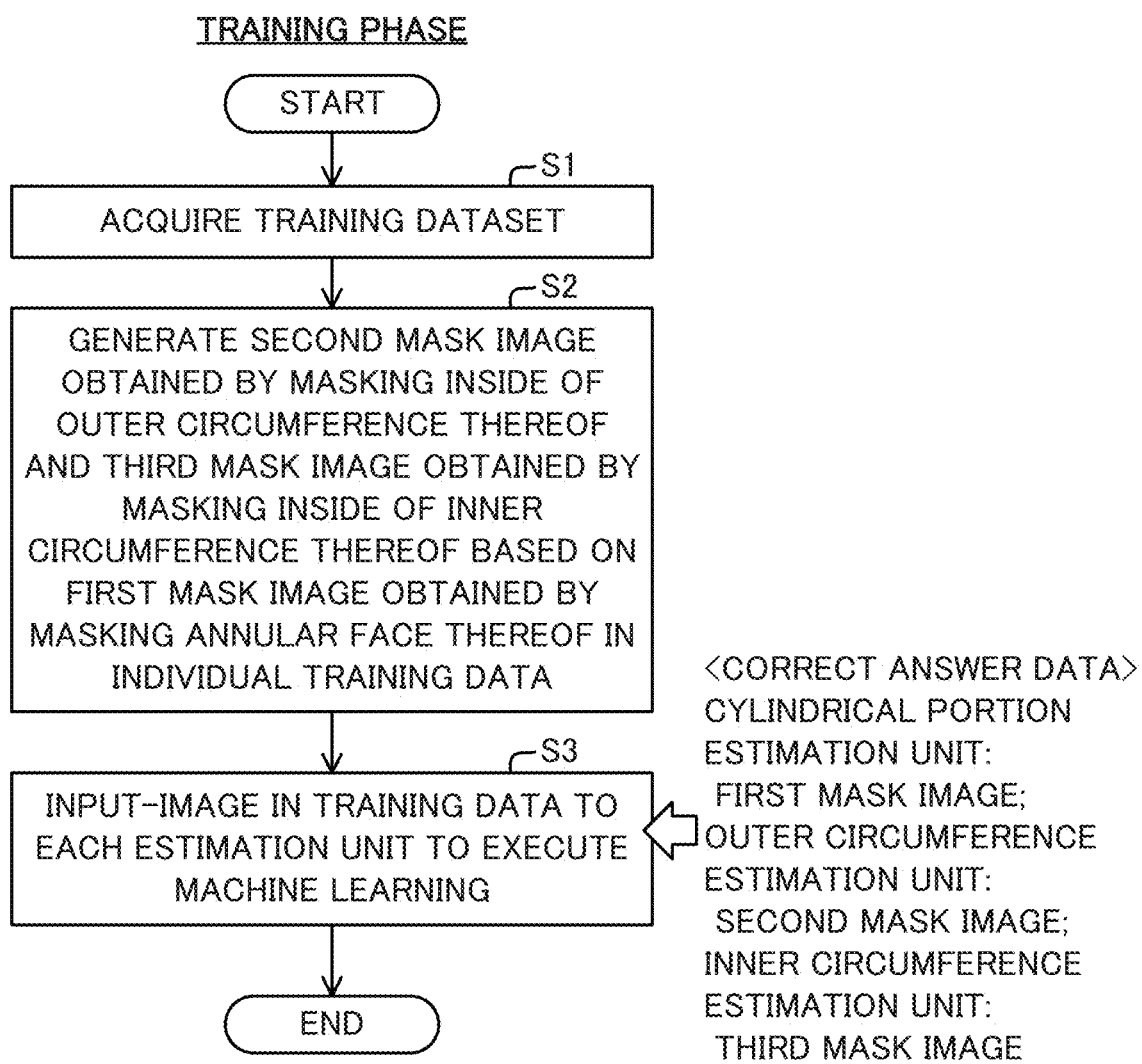
FIG. 14 is a flow chart illustrating an example of operation of a training phase of the estimation unit.

FIG. 14 is a flow chart illustrating an example of operation of a training phase of the estimation units 12 to 14.

As exemplified in FIG. 14, the acquisition unit 15 acquires a training dataset 11b (step S1) and stores the training dataset 11b into the memory unit 11.

The training unit 16 generates, on the basis of the first mask image 112 that is included in each training data 110 and in which the annular face of the target is masked, the second mask image 113 in which the inside of the outer circumference of the annular face is masked and the third mask image 114 in which the inside of the inner circumference of the annular face is masked (step S2).

The training unit 16 inputs the image 111 included in the training data 110 to the estimation units 12 to 14 to execute machine learning (step S3). In the machine learning, the training unit 16 gives the first mask image 112 as correct answer data to the cylindrical portion estimation unit 12; gives the second mask image 113 as correct answer data to the outer circumference estimation unit 13; and gives the third mask image 114 as correct answer data to the inner circumference estimation unit 14.

It is to be noted that the training unit 16 performs machine learning for the estimation units 12 to 14 using multiple training data 110 in the training dataset 11b and ends the processing.

[1-3-2] Example of Operation of Estimation Phase

Figure 15:
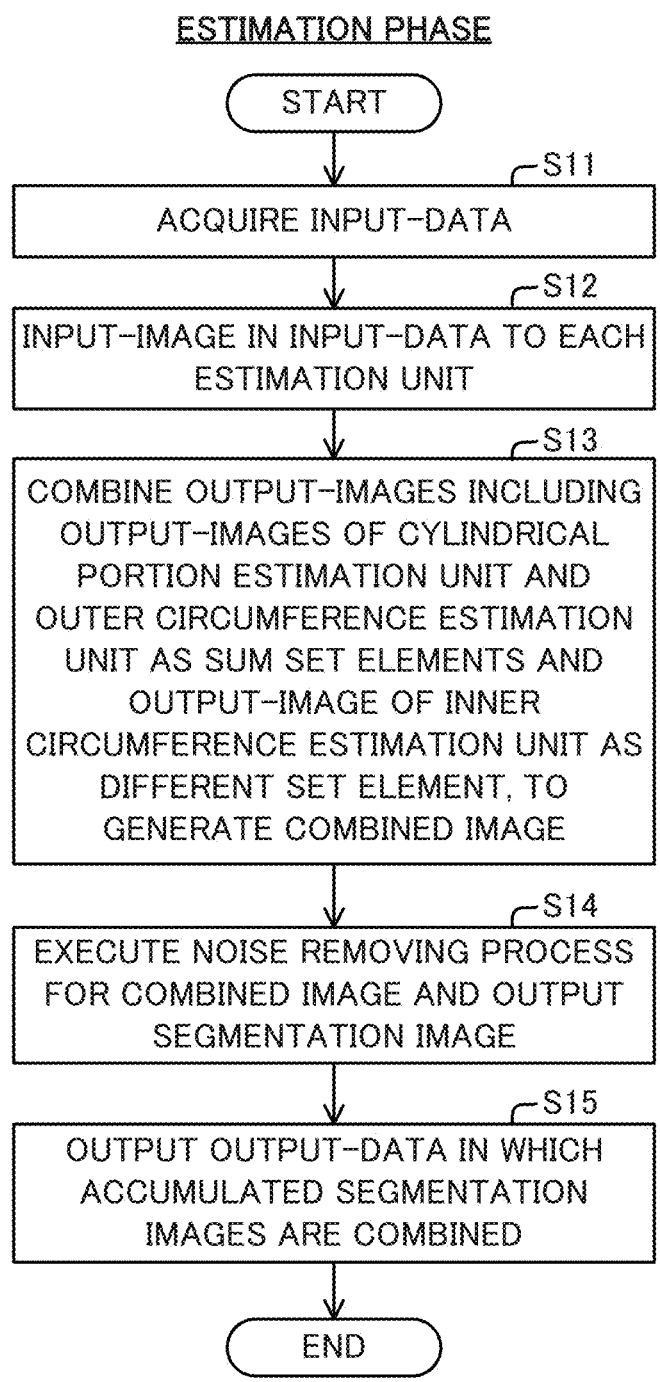
FIG. 15 is a flow chart illustrating an example of operation of an estimation phase of the estimation unit.

FIG. 15 is a flow chart illustrating an example of operation of an estimation phase of the estimation units 12 to 14.

As exemplified in FIG. 15, the acquisition unit 15 acquires input data 11c (step S11) and stores the input data 11c into the memory unit 11.

The execution unit 17 inputs an image 115 in the input data 11c to each of the estimation units 12 to 14 (step S12).

The execution unit 17 determines mask images 12a and 13a outputted from the cylindrical portion estimation unit 12 and the outer circumference estimation unit 13 individually as elements of a sum set and determines the mask image 14a outputted from the inner circumference estimation unit 14 as an element of a difference set. Then, the execution unit 17 combines the mask images 12a to 14a to generate a combined image 116 (step S13). It is to be noted that the combination order of the elements of the sum set and the element of the difference set may be based on the expression (1) or the expression (2) given hereinabove.

The noise removing unit 18 executes a noise removing process for the combined image 116 and outputs a resulting segmentation image 117 (step S14). It is to be noted that the process in step S14 may be omitted.

The outputting unit 19 accumulates the segmentation image 117 and outputs output data 11d in which such accumulated segmentation images 117 are combined (step S15) and ends the processing. It is to be noted that the outputting destination of the output data 11d may be, for example, the memory unit 11 or a computer not depicted or the like.

[1-4] Example of Hardware Configuration

Figure 16:
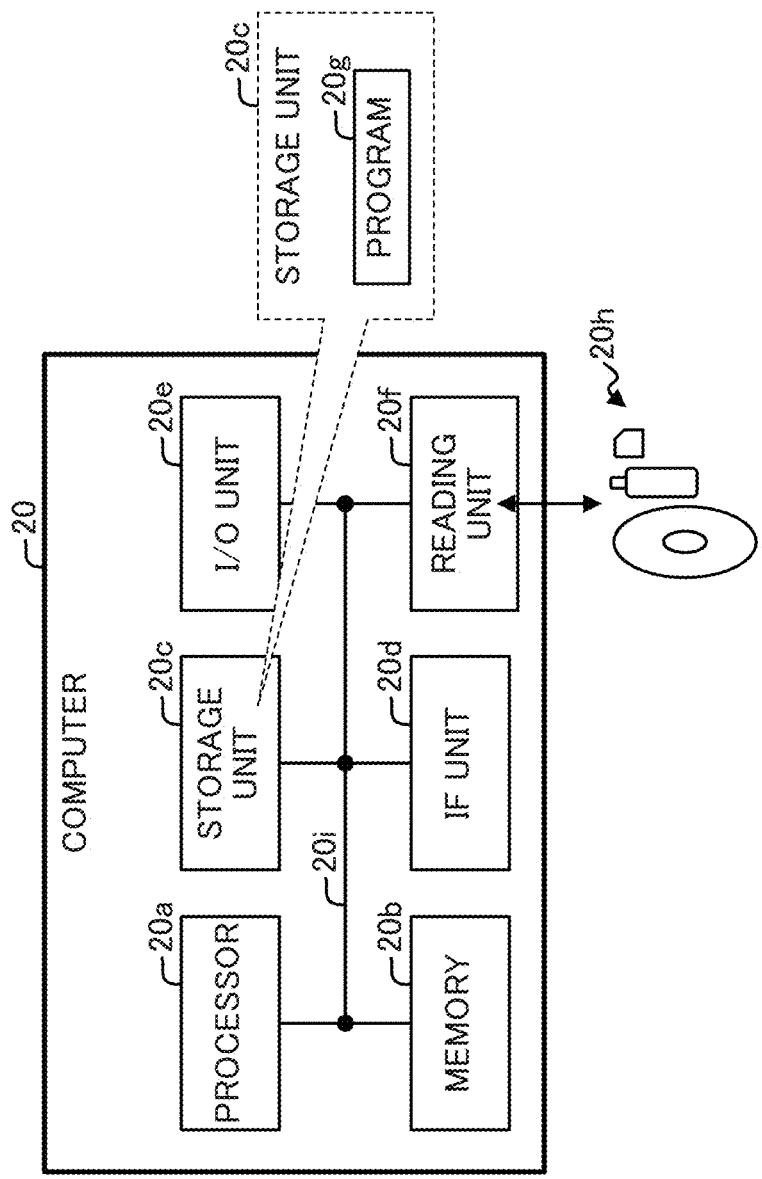
FIG. 16 is a block diagram depicting an example of a hardware configuration of a computer according to the embodiment.

FIG. 16 is a block diagram depicting an example of a hardware (HW) configuration of a computer 20 that implements the functions of the information processing apparatus 1 and the server 10. In the case where a plurality of computers are used as HW resources that implement the functions of the information processing apparatus 1 and the server 10, each computer may have the HW configuration exemplified in FIG. 16.

As depicted in FIG. 16, the computer 20 may illustratively include a processor 20a, a memory 20b, a storage unit 20c, an interface (IF) unit 20d, an input/output (I/O) unit 20e and a reading unit 20f as HW components.

The processor 20a is an example of an arithmetic processing unit that performs various controls and arithmetic operations. The processor 20a may be coupled for mutual communication to the blocks in the computer 20 by a bus 20i. It is to be noted that the processor 20a may be a multiprocessor including multiple processors or may be a multicore processor having multiple processor cores or otherwise may be configured so as to have multiple multicore processors.

As the processor 20a, integrated circuits (ICs) such as, for example, a CPU, an MPU, a GPU, an APU, a DSP, an ASIC and an FPGA are available. It is to be noted that, as the processor 20a, a combination of two or more of such integrated circuits as mentioned above may be used.

For example, processing functions of at least part of the information processing apparatus 1, the acquisition unit 15 of the server 10, at least part of the execution unit 17, the noise removing unit 18 and the outputting unit 19 may be implemented by a CPU, an MPU or the like as the processor 20a. Further, processing functions of at least part of the information processing apparatus 1, the estimation units 12 to 14 of the server 10, the training unit 16 and at least part of the execution unit 17 may be implemented by an accelerator such as a GPU or an ASIC (for example, a TPU) among such processors 20a.

CPU is an abbreviation of Central Processing Unit, and MPU is an abbreviation of Micro Processing Unit. GPU is an abbreviation of Graphics Processing Unit, and APU is an abbreviation of Accelerated Processing Unit. DSP is an abbreviation of Digital Signal Processor, and ASIC is an abbreviation of Application Specific IC and FPGA is an abbreviation of Field-Programmable Gate Array. TPU is an abbreviation of Tensor Processing Unit.

The memory 20b is an example of HW that stores information of various data, programs and so forth. As the memory 20b, one or both of a volatile memory such as, a dynamic random access memory (DRAM), and a nonvolatile memory, such as a persistent memory (PM), are available.

The storage unit 20c is an example of HW that stores information of various data, programs and so forth. As the storage unit 20c, various storage devices such as a magnetic disk device such as a hard disk drive (HDD), a semiconductor drive device such as a solid state drive (SSD) and a nonvolatile memory are available. As the nonvolatile memory, for example, a flash memory, a storage class memory (SCM), a read only memory (ROM) and so forth are available.

Further, the storage unit 20c may store a program 20g (estimation processing program) that implements all or part of various functions of the computer 20. For example, the processor 20a of the information processing apparatus 1 can implement functions as the information processing apparatus 1 exemplified in FIG. 1 by expanding the program 20g stored in the storage unit 20c on the memory 20b and executing the expanded program 20g. Further, the processor 20a of the server 10 can implement the functions as the server 10 exemplified in FIG. 6 by expanding the program 20g stored in the storage unit 20c on the memory 20b and executing the expanded program 20g.

It is to be noted that the storage region at least one of the memory 20b and the storage unit 20c has may be capable of storing the information 11a to 11d depicted in FIG. 6. In other words, the memory unit 11 depicted in FIG. 6 may be implemented by a storage region at least one of the memory 20b and the storage unit 20c has.

The IF unit 20d is an example of a communication IF that performs control and so forth of coupling to and communication with a network. For example, the IF unit 20d may include an adapter that complies with a local area network (LAN) such as the Ethernet (registered trademark), optical communication such as the Fibre Channel (FC) or the like. The adapter may be compatible with a communication method for one or both of wireless and wired communication. For example, the server 10 may be coupled for mutual communication to a different apparatus through the IF unit 20d. For example, the program 20g may be downloaded from the network to the computer 20 through the communication IF and stored into the storage unit 20c.

The I/O unit 20e may include one or both of an inputting apparatus and an outputting apparatus. As the inputting apparatus, for example, a keyboard, a mouse, a touch panel and so forth are available. As the outputting apparatus, for example, a monitor, a projector, a printer and so forth are available.

The reading unit 20f is an example of a reader for reading out information of data and programs recorded on a recording medium 20h. The reading unit 20f may include a connection terminal or device to or into which the recording medium 20h can be connected or inserted. As the reading unit 20f, for example, an adapter that complies with Universal Serial Bus (USB) or the like, a drive device that accesses a recording disk, a card reader that accesses a flash memory such as an SD card and so forth are available. It is to be noted that the recording medium 20h has the program 20g stored therein and the reading unit 20f may read out the program 20g from the recording medium 20h and store the program 20g into the storage unit 20c.

As the recording medium 20h, illustratively a non-transitory computer-readable recording medium such as a magnetic/optical disk, a flash memory and so forth are available. As the magnetic/optical disk, illustratively a flexible disk, a compact disc (CD), a digital versatile disc (DVD), a Blu-ray disk, a holographic versatile disc (HVD) and so forth are available. As the flash memory, illustratively a semiconductor memory such as a USB memory or an SD card is available.

The HW configuration of the computer 20 described above is exemplary. Accordingly, increase or decrease of HW in the computer 20 (for example, addition or deletion of an arbitrary block), division, integration in arbitrary combination, addition or deletion of a bus and so forth may be performed suitably. For example, in the information processing apparatus 1 and the server 10, at least one of the I/O unit 20e and the reading unit 20f may be omitted.

[2] Others

The technique relating to the embodiment described above can be carried out in such a modified or altered form as described below.

For example, the processing functions 12 to 19 provided in the server 10 depicted in FIG. 6 may individually be merged or divided in arbitrary combinations.

It is to be noted that, although it is described in the description of the embodiment that the target, image and annular face are a fetus, an echo image of the fetus and the thoracic cage, respectively, they are not restrictive. The technique according to the embodiment can be applied also to various objects, images and annular faces as described below.

As the target, for example, various objects having a cylinder or a substantially cylindrical shape such as a part of the human body, a structure such as an earthen pipe, a steel pipe or a hose and so forth are available. As the image, various images captured in a plane crossing an extension direction of the annular face of the target are available. For example, as the image, various images are available including an ultrasonic image other than an echo image, a magnetic resonance image, an X-ray image, a detection image by a sensor that captures a temperature, electromagnetic waves or the like and a captured image by an image sensor that captures visible light or invisible light. As the annular face, in addition to a solid part of an object such as an outer wall or an inner wall in an image, a liquid part and a gas (space) part are available.

Further, the server 10 depicted in FIG. 6 may be configured such that the various processing functions are implemented by a plurality of apparatus that cooperate with each other through a network. As an example, the acquisition unit 15 and the outputting unit 19 may be a Web server; the estimation units 12 to 14, training unit 16, execution unit 17 and noise removing unit 18 may be an application server; and the memory unit 11 may be a database (DB) server. In this case, the Web server, the application server and the DB server may cooperate with each other through a network to implement the processing functions as the server 10.

Furthermore, the processing functions relating to the learning process of the estimation units 12 to 14 (estimation units 12 to 14, acquisition unit 15 and training unit 16) and the estimation process (execution unit 17, noise removing unit 18 and outputting unit 19) may be provided by devices different from each other. Also in this case, the devices may cooperate with each other through a network to implement the processing functions as the server 10.

According to one aspect, the accuracy in estimation of an annular face of a target can be improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an estimation processing program that causes a computer to execute a process comprising:
    inputting an input-image obtained by photographing a target to each of a first estimation model that performs segmentation for masking a region of an annular face of the target, a second estimation model that performs segmentation for masking a region in an outer circumference of the annular face and a third estimation model that performs segmentation for masking a region in an inner circumference of the annular face; and
    outputting a region image, as an estimated region of the annular face of the target in the input-image, in response to inputting of the input-image, the region image being obtained by synthesizing a first element, a second element and a third element, the first element being a first region outputted as an estimation result of the first estimation model in response to inputting of the input-image and being used for calculation of a sum set in the synthesizing, the second element being a second region outputted as an estimation result of the second estimation model in response to inputting of the input-image and being used for calculation of a sum set in the synthesizing, the third element being a third region outputted as an estimation result of the third estimation model in response to inputting of the input-image and being used for calculation of a difference set in the synthesizing.

2. The non-transitory computer-readable recording medium according to claim 1, wherein
    the outputting outputs a region obtained by excluding the third region from a region of a sum set of the first region and the second region as the region estimated as the annular face of the target in the input-image.

3. The non-transitory computer-readable recording medium according to claim 1, wherein
    the outputting outputs a region of a sum set of the first region and a region obtained by excluding the third region from the second region as the region estimated as the annular face of the target in the input-image.

4. The non-transitory computer-readable recording medium according to claim 1, wherein the process further comprises:
    acquiring a dataset of training data each including a training image obtained by photographing a training target and annotation data indicative of a region corresponding to the training target in the training image;
    executing machine learning of the first estimation model based on the estimation result acquired in response to inputting of the training image and outputted by the first estimation model and the annotation data as first annotation data;
    executing machine learning of the second estimation model based on the estimation result acquired in response to inputting of the training image and outputted by the second estimation model and second annotation data obtained by processing the annotation data so as to indicate a region inside the outer circumference of the annular face of the training target in the training image; and
    executing machine learning of the third estimation model based on the estimation result acquired in response to inputting of the training image and outputted by the third estimation model and third annotation data obtained by processing the annotation data so as to indicate a region inside the inner circumference of the annular face of the training target in the training image.

5. The non-transitory computer-readable recording medium according to claim 1, wherein the process further comprises:
    outputting a result of a noise removing process performed for the region estimated as the annular face of the target in the input-image.

6. The non-transitory computer-readable recording medium according to claim 1, wherein
    the input-image is an ultrasonographic image.

7. An estimation processing method executed by a computer, the estimation processing method comprising:
    inputting an input-image obtained by photographing a target to each of a first estimation model that performs segmentation for masking a region of an annular face of the target, a second estimation model that performs segmentation for masking a region in an outer circumference of the annular face and a third estimation model that performs segmentation for masking a region in an inner circumference of the annular face; and outputting a region image, as an estimated region of the annular face of the target in the input-image, in response to inputting of the input-image, the region image being obtained by synthesizing a first element, a second element and a third element, the first element being a first region outputted as an estimation result of the first estimation model in response to inputting of the input-image and being used for calculation of a sum set in the synthesizing, the second element being a second region outputted as an estimation result of the second estimation model in response to inputting of the input-image and being used for calculation of a sum set in the synthesizing, the third element being a third region outputted as an estimation result of the third estimation model in response to inputting of the input-image and being used for calculation of a difference set in the synthesizing.

8. The estimation processing method according to claim 7, wherein
the outputting outputs a region obtained by excluding the third region from a region of a sum set of the first and second regions as the region estimated as the annular face of the target in the input-image.

9. The estimation processing method according to claim 7, wherein
the outputting outputs a region of a sum set of the first region and a region obtained by excluding the third region from the second region as the region estimated as the annular face of the target in the input-image.

10. The estimation processing method according to claim 7, further comprising:
acquiring a dataset of training data each including a training image obtained by photographing a training target and annotation data indicative of a region corresponding to the training target in the training image;
executing machine learning of the first estimation model based on the estimation result acquired in response to inputting of the training image and outputted by the first estimation model and the annotation data as first annotation data;
executing machine learning of the second estimation model based on the estimation result acquired in response to inputting of the training image and outputted by the second estimation model and second annotation data obtained by processing the annotation data so as to indicate a region inside the outer circumference of the annular face of the training target in the training image; and
executing machine learning of the third estimation model based on the estimation result acquired in response to inputting of the training image and outputted by the third estimation model and third annotation data obtained by processing the annotation data so as to indicate a region inside the inner circumference of the annular face of the training target in the training image.

11. The estimation processing method according to claim 7, further comprising:
outputting a result of a noise removing process performed for the region estimated as the annular face of the target in the input-image.

12. The estimation processing method according to claim 7, wherein
the input-image is an ultrasonographic image.

13. An information processing apparatus, comprising:
an image inputting circuit configured to input an input-image obtained by photographing a target to each of a first estimation model that performs segmentation for masking a region of an annular face of the target, a second estimation model that performs segmentation for masking a region in an outer circumference of the annular face and a third estimation model that performs segmentation for masking a region in an inner circumference of the annular face; and
a region outputting circuit configured to output a region image, as an estimated region of the annular face of the target in the input-image, in response to inputting of the input-image, the region image being obtained by synthesizing a first element, a second element and a third element, the first element being a first region outputted as an estimation result of the first estimation model in response to inputting of the input-image and being used for calculation of a sum set in the synthesizing, the second element being a second region outputted as an estimation result of the second estimation model in response to inputting of the input-image and being used for calculation of a sum set in the synthesizing, the third element being a third region outputted as an estimation result of the third estimation model in response to inputting of the input-image and being used for calculation of a difference set in the synthesizing.

14. The information processing apparatus according to claim 13, wherein
the region outputting circuit outputs a region obtained by excluding the third region from a region of a sum set of the first region and the second region as the region estimated as the annular face of the target in the input-image.

15. The information processing apparatus according to claim 13, wherein
the region outputting circuit outputs a region of a sum set of the first region and a region obtained by excluding the third region from the second region as the region estimated as the annular face of the target in the input-image.

16. The information processing apparatus according to claim 13, further comprising:
a data acquisition circuit configured to acquire a dataset of training data each including a training image obtained by photographing a training target and annotation data indicative of a region corresponding to the training target in the training image; and
a training circuit configured to:
execute machine learning of the first estimation model based on the estimation result acquired in response to inputting of the training image and outputted by the first estimation model and the annotation data as first annotation data;
execute machine learning of the second estimation model based on the estimation result acquired in response to inputting of the training image and outputted by the second estimation model and second annotation data obtained by processing the annotation data so as to indicate a region inside the outer circumference of the annular face of the training target in the training image; and
execute machine learning of the third estimation model based on the estimation result acquired in response to inputting of the training image and outputted by the third estimation model and third annotation data obtained by processing the annotation data so as to indicate a region inside the inner circumference of the annular face of the training target in the training image.

17. The information processing apparatus according to claim 13, wherein the region outputting circuit
outputs a result of a noise removing process performed for the region estimated as the annular face of the target in the input-image.

18. The information processing apparatus according to claim 13, wherein
the input-image is an ultrasonographic image.

\* \* \* \* \*